United States Patent [19]
Gokyu

[11] 4,044,640
[45] Aug. 30, 1977

[54] METHOD OF MAKING REINFORCEMENTS FOR CONCRETE
[75] Inventor: Isao Gokyu, Musashino, Japan
[73] Assignee: Nippon Concrete Industries Co., Ltd., Tokyo, Japan
[21] Appl. No.: 630,629
[22] Filed: Nov. 10, 1975
[51] Int. Cl.² .................... B26D 3/00; B26D 5/20
[52] U.S. Cl. ........................................ 83/42; 10/32; 83/356.3
[58] Field of Search .................... 10/29–32, 10/34, 37, 41; 83/37, 42, 50, 355, 356.3, 676; 72/199, 203

[56] References Cited
U.S. PATENT DOCUMENTS

| 11,172 | 6/1854 | Miller | 10/32 |
| 116,091 | 6/1871 | Paull et al. | 10/32 |
| 2,601,200 | 6/1952 | Amos et al. | 83/42 X |
| 3,504,516 | 4/1970 | Sundberg | 72/203 |

Primary Examiner—E. M. Combs
Attorney, Agent, or Firm—Fidelman, Wolffe & Waldron

[57] ABSTRACT

This invention relates to a method of making reinforcements for concrete, in which a band material of a thin steel plate which has a certain thickness and a certain width and or which both ends are bent is fed until it contacts with a rotating cutter wheel having edges which height is approximately same as the thickness of the said plate, and the said material is cut so that reinforcements of a certain dimension are continuously made; and an apparatus therefor comprising a cutter wheel, a pushing plate and a supporter which constitute a cutting part, and some couples of belt pulleys to continuously feed the material, or further having an equipment to bend both ends of the said material.

4 Claims, 11 Drawing Figures

METHOD OF MAKING REINFORCEMENTS FOR CONCRETE

SUMMARY OF THE INVENTION

This invention relates to a method of making reinforcements for concrete and an apparatus therefor.

For reinforcements to be mixed in concrete in order to improve the strength of the concrete, glass fiber, organic fiber, steel wire and the like have been used heretofore. Of these a steel wire is good in adhesiveness and has a large resistance to the break and further can be easily mixed in concrete in comparison with other reinforcements. It has been experimentally proved that steel wires which are 0.2-0.5 mm. in diameter and 1-5 cm. in length are most desirable.

However steel wires of 0.2-0.5 mm. in diameter are made by a wire drawing means. In that means many processes are required, and it results in very high cost.

This invention is to dissolve the above defect and to provide a method of making reinforcements having superior property and an apparatus therefor. The first object of the present invention is to obtain cheap reinforcements by a simple method in which few processes are required.

The second object of the present invention is to obtain reinforcements which are superior in adhesiveness to conventional steel wires.

The third object of the present invention is to provide a method in which oddments left at the time of cutting a wide steel plate can be also utilized as materials and an apparatus therefor.

Other objects and the feature of the present invention will be apparent in some embodiments described later.

DETAILED DESCRIPTION OF THE INVENTION

Figure 1:
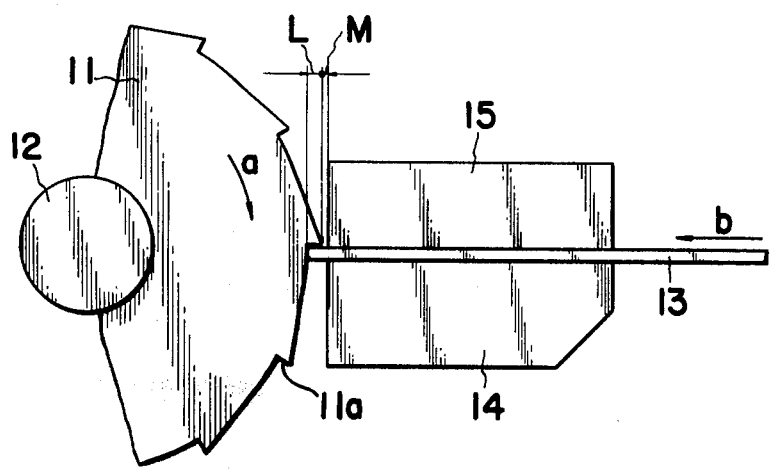
FIG. 1 is an enlarged fragmental side elevation view of a cutting part showing briefly the executing condition of the method according to the present invention.
Figure 2:
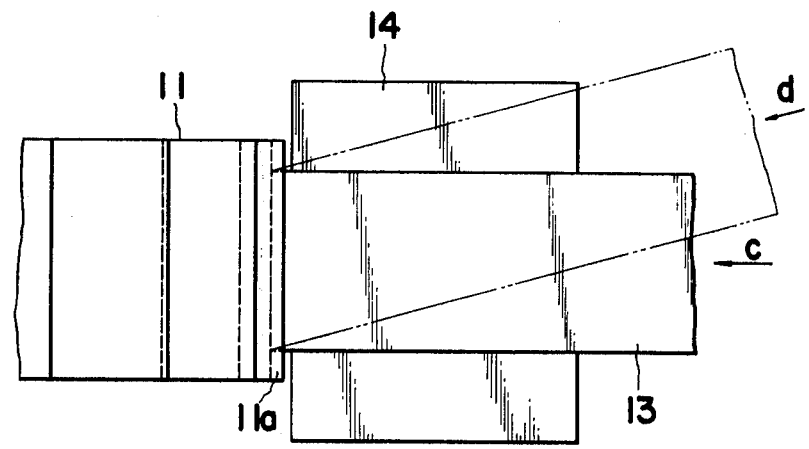
FIG. 2 is an enlarged fragmental plan view of the same part as shown in FIG. 1.

FIG. 1 is an enlarged side elevation view of a cutting part fundamentally showing the executing condition of the method according to the present invention. Reference numeral 11 designates a cutter wheel having a number of edges 11a on the outer periphery said cutter wheel width being in excess of the width of the band material as shown in FIG. 2. The cutter wheel 11 is put on a shaft 12 and is driven to rotate in the direction of arrow a. The height L of the edge 11a is approximately same as the thickness of a band material 13, i.e. about 0.2-0.5 mm. Reference numeral 14 designates a supporter receiving the material 13 at a cutting part. The supporter 14 is located at a position apart a certain distance M, about 0.05 mm., from the tip of the edge 11a.

Reference numeral 15 designates a pushing plate to press the material 13, having a width of 10-50 mm on the supporter 14. The pushing plate 15, the supporter 14 and the cutter wheel 11 constitute a cutting part. The material 13 is inserted between the pushing plate 15 and the supporter 14 in the direction of arrow b, and the forward end of the material 13 contacts with the root of the edge 11a. Namely the material 13 protrudes beyond the end of the supporter 14 on the cutter wheel side by the length of L and M. In this state the material 13 is fixed by the pressure force of the pushing plate 15 and cut by the shearing force of the edge 11a, and thereby reinforcements of about 10-50 mm. in length, 0.2-0.5 mm. in width and 0.2-0.5 mm. in thickness are made.

FIG. 2 is a plan view showing the above cutting state. The bank material 13 is fed in the direction of arrow c which is perpendicular to the edge 11a. It is also possible that the material 13 is fed slantingly in the direction of arrow d as shown by a two-dotted line. In case it is fed slantingly, long reinforcements can be obtained even from a narrow material in comparison with the case the material is fed perpendicularly. Moreover it is possible to use oddments which width is 10-50 mm. left at the time of cutting a wide thin steel plate as band materials.

Figure 3:
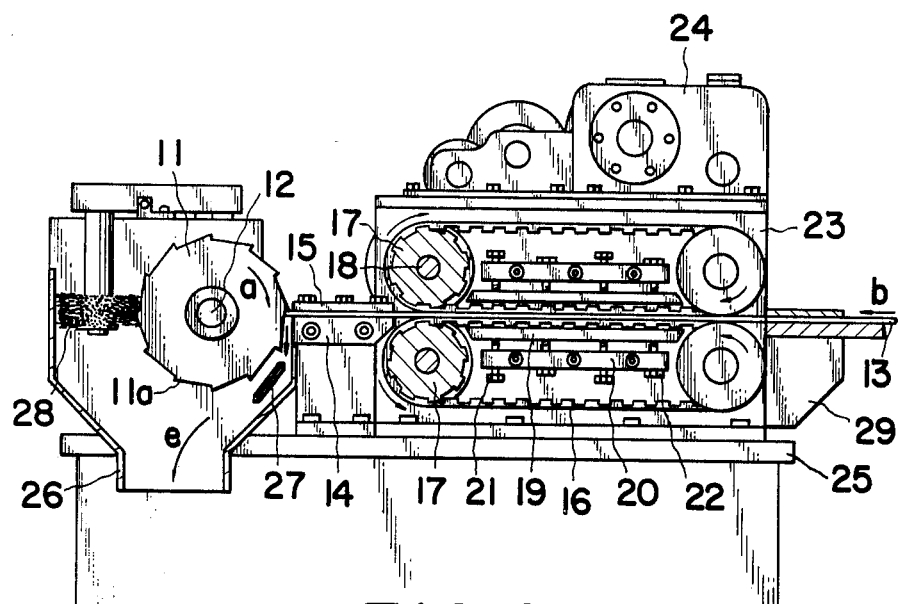
FIG. 3 is a partially sectional side elevation view showing a main part of a cutting equipment of the present invention.

FIG. 3 is a partially sectional side elevation view embodying the cutting equipment shown in FIGS. 1 and 2. Two or more couples of pulleys 17 for feeding materials are provided with endless belts 16 made of rubber, plastic or the like put on the outer peripheries, and they are supported by shafts 18 at the upper and lower positions facing each other at the rear part of the supporter 14 and the pushing plate 15. The material 13 is held between the belt pulleys 17 and continuously fed to the cutting part by the rotation of the pulleys. The outer surface of the pulley 17 and the inner surface of the belt 16 have concave and convex parts which engage with each other, and thereby the slip of them is prevented.

Reference numeral 19 designates a belt holder provided on the inner side of each belt 16. The belt holder 19 push the belts 16 at the position they are adjacent to each other from the upper and lower sides in order to firmly hold the material 13 placed between the belts. Reference numeral 20 designates a bracket to support the said belt holder 19 through pushing bolts 21 and drawing bolts 22, 23 designates a frame supporting the belt pulleys 17 and the brackets 20 on the side surface and a speed reduction mechanism 24 on the upper surface, and 25 designates a bed supporting the whole part of the apparatus. The shaft 12 of the cutter wheel 11 is also supported on the bed 25.

Reference numeral 26 designates a shoot provided at the lower part of the cutter wheel 11. The shoot 26 receives the cut material, i.e. reinforcements 27, to lead them to a certain place as shown by arrow e. Reference numeral 28 designates a brush made of wire or the like which is always rotating as it contacts with the edges 11a of the cutter wheel 11 on the opposite side of the cutting part to remove the reinforcements 27 and scraps attaching to the outer periphery of the cutter wheel 11. Reference numeral 29 designates a guide for introducing the material provided at the rear part of the pulleys 17.

The method of making the reinforcements 27 using the apparatus shown in FIG. 3 will be described hereinafter. The material 13 is first held between the upper and lower belts 16 put around the pulleys 17 and fed in the direction of arrow b by the rotation of the pulleys 17. The material 13 is held again between the supporter 14 and the pushing plate 15 and the material protruded beyond the forward end of the supporter 14 is cut by the edge 11a. The reinforcements of a certain dimension described referring to FIGS. 1 and 2 are dropped and exhausted from the shoot 26. As for the mechanical and operational conditions at the time of making the reinforcements, for example number of edges are 30, height of the edge is 0.3 mm. revolutional speed of the cutter wheel is 100 r.p.m., and the material feeding speed is 900 mm./min.

Figure 4:
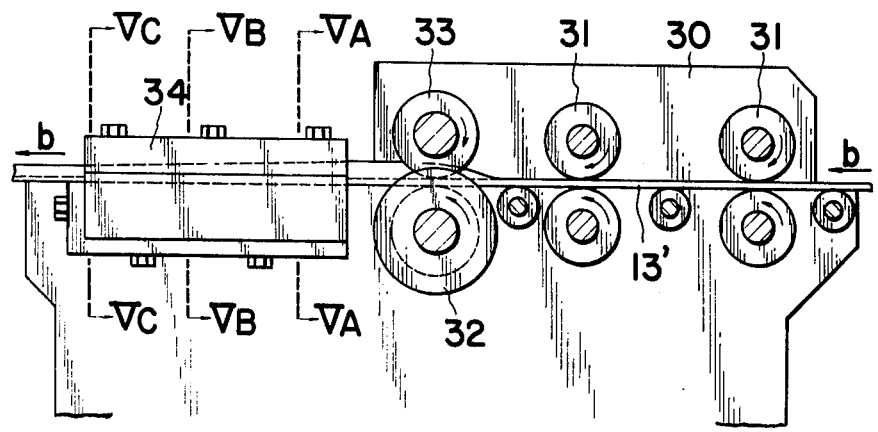
FIG. 4 is a partially sectional side elevation view showing a main part of a bending equipment which are connected to the rear part of the cutting equipment.
Figure 7:
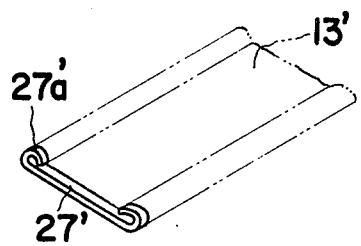
FIG. 7 is a perspective view of a reinforcement made through bending processes.

FIG. 4 is a partially sectional side elevation view of a main part of a bending equipment to make a reinforcement 27' having bent parts 27'a at both ends as shown in FIG. 7. This equipment is connected to the rear part of the cutting equipment shown in FIG. 3.

Reference numeral 30 designates a frame of the bending equipment. The frame 30 is provided with rollers 31 and 31 to introduce and feed the material 13' from the rear side, a couple of rollers 32 and 33 to bend the material 13' into a channel shape, and a bending die 34 in order from the rear side (from the right in the drawing). The material 13' is fed on an approximately horizontal pass-line. The material 13' is first formed into a channel shape by a female receiving roller 32 and a male pushing roller 33, and both bent ends of the channel are further bent inside by the die so as to be formed into a shape shown in FIG. 7, and next the material 13' is fed to the cutting equipment shown in FIG. 3 from the rear side.

In the die 34, the shape of the inner part through which the material 13' passes changes gradually as shown in FIG. 5(A), 5(B) and 5(C). The shape in FIG. 5(A) is only to receive the channel shaped material 13', the shape in FIG. 5(B) is to round the both ends of the material, and the shape in FIG. 5(C) is to bend the both ends of the material further inside. Therefore the sectional shape shown in FIG. 5(C) is a roughly final shape of the material 13'.

FIGS. 6(A), 6(B) and 6(C) show bending rollers which are used instead of the die 34 and are respectively corresponding to the section at each position shown in FIGS. 5(A), 5(B) and 5(C). The surfaces of rollers 35, 36, 37, 38, 39 and 40 have concave, convex and round parts in order to obtain a desired shape of the material. The material 13' passes between each couple of rollers so as to be bent and formed into a desired shape, and it reaches to the cutter wheel 11 through the belt pulleys 17.

Figure 5:
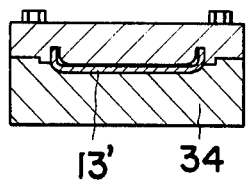
FIG. 5(A) is a cross-sectional view along the line $V_A$—$V_A$ of FIG. 4.
FIG. 5(B) is a cross-sectional view along the line $V_B$—$V_B$ of FIG. 4.
FIG. 5(C) is a cross-sectional view along the line $V_C$—$V_C$ of FIG. 4.
Figure 5:
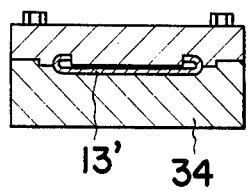
Figure 5:
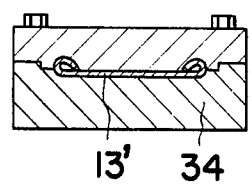
Figure 6:
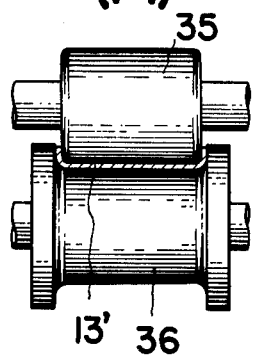
FIGS. 6(A), 6(B) and 6(C) are front elevation views of bending rollers in other embodiment which are respectively corresponding to the sectional parts of the die shown in FIG. 5(A), 5(B) and 5(C)
Figure 6:
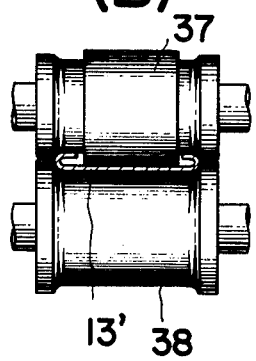
Figure 6:
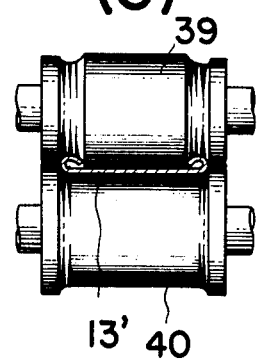

The reinforcement 27' made by the apparatus shown in FIGS. 4, 5 and 6 has a shape shown in FIG. 7. Since this shape of reinforcement 27' has bent parts 27'a at both ends, when it is mixed in concrete, the adhesiveness is further improved and thereby the break and cracks of concrete are prevented.

Since the present apparatus is constructed as above-described, reinforcements suitable to obtain strong concrete are made cheap by simple processes, and under some circumstances oddments left at the time of cutting a wide thin plate can be used as materials.

I claim:

1. Method of making reinforcements for concrete from a band material of a steel plate, said reinforcements having preferred dimensions, comprising the steps of:
   rotating a cutter wheel about is rotational axis, said cutter wheel width being in excess of the width of said band material, said cutter wheel including a number of cutting edges extending inwardly from its outer periphery, the height of said edges being in the range of 0.2 to 0.5 mm. from a root to said outer periphery, said edges being aligned parallel to said rotational axis of said cutter wheel;
   supporting said band of material on a planar surface adjacent said rotating cutter wheel, the spacing between said surface and said cutting edge being about 0.05 mm., said planar surface being parallel to said rotational axis;
   feeding said band of material to said rotating cutter wheel until the forward end of said material contacts said cutter wheel at said root of said cutting edge, the thickness of said band being approximately equal to the height of said cutting edge, the width of said band being 10 to 50 mm.;
   shearing said band of material by contact of one of said cutting edges, whereby a superior reinforcement for concrete is formed.

2. Method of making reinforcements for concrete, as claimed in claim 1, in which said band material is fed perpendicularly to an edge of said cutter wheel.

3. Method of making reinforcements for concrete, as claimed in claim 1, in which said band material is fed slantingly relative to an edge of said cutter wheel.

4. Method of making reinforcements for concrete, as claimed in claim 1, wherein said band material has bent portions at both longitudinal edges.

* * * * *